R. N. Eagle,
Animal Shackle.
N° 38,100. Patented Apr. 7, 1863.
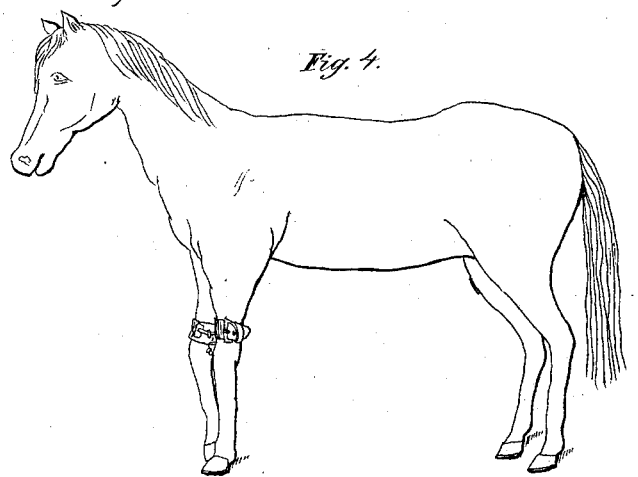
Fig. 4.
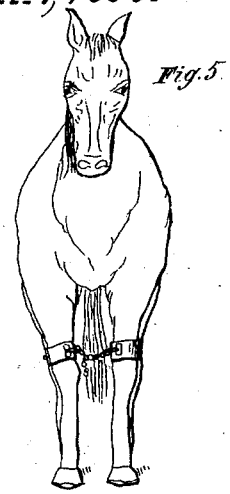
Fig. 5.
Fig. 1. Fig. 2. Fig. 3.
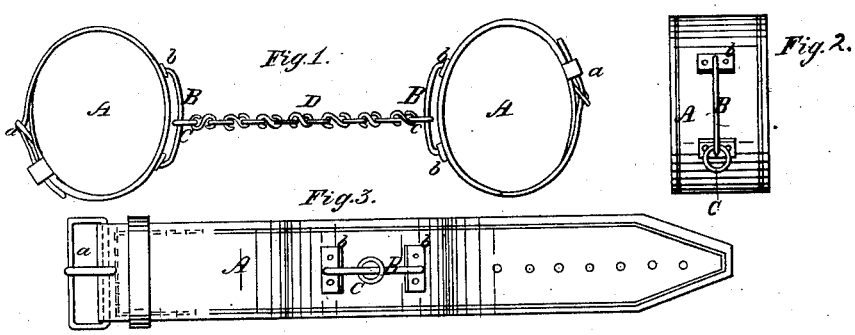
Fig. 6.
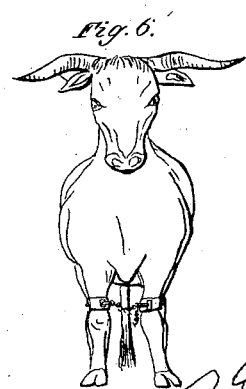
Witnesses.
Octavius Knight
R. H. Mayhew
Inventor
R. N. Eagle

UNITED STATES PATENT OFFICE.

ROBERT N. EAGLE, OF WASHINGTON, DISTRICT OF COLUMBIA.

IMPROVED HOPPLE FOR HORSES AND OTHER ANIMALS.

Specification forming part of Letters Patent No. 38,100, dated April 7, 1863.

*To all whom it may concern:*

Be it known that I, ROBERT NELSON EAGLE, of the city and county of Washington, in the District of Columbia, have invented certain new and useful Improvements in Hopples for Fettering Horses, Mules, Horned Cattle, and other Animals; and I do hereby declare the following to be a full and exact description of the same, reference being had to the accompanying drawings, making part of this specification, in which—

Figure 1 is a plan of my improved hopple, whereof A represents one leg-band, A' the other leg-band, and D the connecting chain or strap. Fig. 2 is a side view of one leg-band when buckled or fastened on. Fig. 3 is a view of the same opened. Figs. 4, 5, and 6 are other views, illustrating the mode of applying this hopple to animals.

Similar letters of reference indicate corresponding parts in the several views.

My invention consists in an improved construction of hopples for fettering horses, mules, horned cattle, and other animals, the said hopples being adapted for attachment to any two legs of the animal, or for connecting different animals together, and so applied as to prevent friction, as will hereinafter be more fully explained.

The improved hopples may be applied either above or below the hock or knee, or below the fetlock, but are especially designed for attachment above the knee, which mode possesses various advantages, some of which will be set forth in the sequel.

In order that others skilled in the art to which my invention appertains may be enabled fully to understand and use the same, I will proceed to describe its construction, with some of the modes of its application.

A A' are a pair or set of leg-bands, which may be provided either with buckles *a a* or adapted to be tied on or otherwise secured to the two fore legs, two hind legs, or to one fore and one hind leg of a horse, mule, or other animal.

B B represent metallic bars, formed or furnished with flanges *b b*, by or through which said bars may be riveted on or secured to the bands A A.

C C are rings, which slide freely on the bars B B.

D represents a strap, cord, or chain of any suitable length connecting the rings C C.

The leg-bands, of any desired width, may be made from leather, india-rubber, gutta-percha, cotton, hemp, or woolen fabrics, felt, or a combination of such, or any suitable material, and be connected by straps or thongs of leather, rope, or chain, or by any contrivance that will allow of variation in length. The said bands A A' may be flat or convex on their inner sides, so as more effectually to prevent chafing of the leg, and the flanges *b b* and buckle *a* be formed to correspond and fit the transverse concavity of the outer surface of the band.

The length of the bars B B may be varied in accordance with the size of the animal's leg, so as to permit the necessary latitude or horizontal play for the rings C C, thus obviating the necessity for the least movement of the band itself upon the leg. The bars B B may be of any desired arch, and curved to correspond with the form of the leg around which the band A passes, and the leather under said bars also bent and adapted to this curvature before being riveted or finally secured in position upon the band by the flanges *b b*. By this means the band is exactly fitted to the convexity of the leg, and serves as an additional security against the band shifting or moving about upon the leg. The inner surface of the band may also be padded throughout to prevent chafing, or have vertical puffs or rolls introduced or applied on their inner surface, and in such places and positions as to fit and fill the cavities between the bones and tendons of the leg.

The bars B B may be made of wrought or malleable iron, steel, or other suitable material, and so applied that when the band is in position said bar will come upon the inner side of the leg, with the buckle or fastening upon the opposite or outer side, this being the position of the band when the legs of a single animal are connected.

For attaching two or more animals together, whether by the legs, neck, or girth, the bars would necessarily come upon the outer side of the bands and legs; or, as it would be in case of both animals being hoppled as well as fettered together at the same time, bars would be required both upon the outer and inner side of the bands. This mode of construction is especially adapted for hoppling and fettering spans or yokes of horses and cattle which are worked together. Any desired number of the bars B B may be attached to one and the same band, either running parallel with or in any other required direction in reference to each other, or with the band itself. The bars B B may be arched, as already shown, or be constructed straight, or curved in any horizontal or vertical direction, or be formed and applied in sections of lengths, instead of in one length, and be placed anywhere upon the bands, and be secured to the same otherwise than in the manner above shown, by rivets through the flanges b b—as, for instance, by wiring or stitching it on with threads or thongs. The rings or loops C C may be so constructed as to work in a slot, instead of sliding along the bars B B.

In an apparatus of the kind described all unnecessary weight is avoided, while the animal is so completely under control that but little strength is required in its construction, and similar hopples being also safely attached to the hind legs and worn at the same time with those upon the fore legs without interfering with the natural motion of the limbs, the restrainst is thereby only rendered still more effectual.

Some of the advantages attained by applying hopples to the legs of an animal above the knee instead of below the fetlock, are, first, that a greater degree of power is secured over the animal while in motion; second, that the increase or diminution of this power or restraining force may be effected without injury to the limbs or gaits of the animal, or hindering the natural, and consequently necessary, motion of his limbs; thirdly, that less constraint is imposed upon his limbs or in the naturalness of their position while in repose; hence a hopple, at once easy of adjustment, immovable under all circumstances in its position upon the legs, simple and economical in its construction, free from the fault of chafing and sand-scalding, yet withal allowing of a natural motion to the limbs without compromising that greater or less degree of restraint so desirable in the use of such an appendage, has long been a desideratum not only of horse equipage in military service, but in the more domestic and no less important ramifications of its use among the pastoral, agricultural, and rural populations of the world generally, where unbroken stock has to be made subservient, vicious animals subdued, jumping ones restrained, and the range of working oxen, cows, &c., restricted within given limits.

The usual manner of hoppling below the knees is notoriously bad, as it not only strains or wrenches the limbs and shoulders of the animal upon any sudden and severe motion being attempted in fright or struggling to escape, but has the effect of ultimately deranging his "gaits," especially that of the "gallop," which it contracts, as by long use of the hopples below the fetlock the animal is inclined to gallop off with his fore feet more together than is proper or which the natural gait allows. Again, hopples of ordinary construction, unless rendered secure from chafing by means of pads and other contrivances, which vastly increase both the weight and its cost of construction, bring irremediable sores and chafe-marks, which are caused by the constant friction of the leg-bands in their partial revolution around the ankles as the feet alternately advance, and, being applied at a point of the leg so near the ground, the mud, dust, &c., accumulate and soon grind a way through the hide, leaving the beast lame. Another objection is that the animal is often checked or "tripped" by snags of roots, fallen branches, briars, points of rocks and stones, or other irregularities of the ground, which are caught by the "connecting-strap," and can only be overcome by jumping the fore feet over the obstacle. The haunches, then, of the animal must be drawn in, the hind feet closed up or gathered upon the fore ones, and the spring made with a short but violent effort of both fore feet together, all of which must, of course, be more or less exhausting to the strength of the animal, according to the frequency of such efforts, than if he were able to step over the obstacle and no connecting-strap interfered. Again, in lying down or rising up most animals require the use of their knees, and when the hopple is attached to the fetlocks or below them they are forced in rising, first, to lay back upon their haunches; next, to spring forward their fore feet, with legs stretched out to their utmost, and, finally, from this angle of position, to rise by a sudden plunge forward—all of which must strain the back more than if they were able to rise by degrees and with the assistance of the knees and haunches drawn in to support them. Finally, the use of the feet and legs below the knees is required in "stamping" during the "fly season," as well as in supporting the body while the animal is performing the frequent motions of assisting the tail in removing the annoyance, with the tongue and teeth at their sides and even rearmost extremities, and hence, if the hopple is attached to the feet, the curvature of the body has to be made without the under props or support of straddled legs.

In addition to the hopple above described, I propose to construct another class, intended especially for gaiting animals, and to which it will be necessary to attach, in addition to the bars B B, fixed staples to the rear of the said bars on the fore-leg bands and to the front of the bars on the rear-leg bands, although I do not restrict myself to the number or position of these fixed staples, whether upon the front or hind leg hopples.

Having thus described my invention and a way of carrying it into effect, I wish it distinctly understood that I do not confine myself to the precise arrangement or details herein laid down, but propose to vary the same, as experience may prove to be desirable, without departing from the essential features of the invention.

What I claim as new, and desire to secure by Letters Patent, is—

Constructing hopples for fettering animals with bars B B, adapted to permit a limited motion of the attached ends of the strap or cord D independently of the leg-band, and without turning or slipping the latter.

R. N. EAGLE.

Witnesses:
   OCTAVIUS KNIGHT,
   R. H. MAYHEW.